United States Patent Office 3,652,654
Patented Mar. 28, 1972

---

3,652,654
STAGED OXYGEN FEED IN A CATALYTIC PROCESS FOR THE MANUFACTURE OF UNSATURATED ACIDS AND ESTERS
Kin Hsueh-Yuan Tsu, Norwalk, Conn., assignor to American Cyanamid Company, Stamford, Conn.
No Drawing. Continuation-in-part of application Ser. No. 818,818, Apr. 23, 1969. This application May 5, 1970, Ser. No. 34,907
Int. Cl. C07c *51/24, 67/00, 69/54*
U.S. Cl. 260—486 D         7 Claims

ABSTRACT OF THE DISCLOSURE

In a process of making an unsaturated aliphatic acid or ester by catalytic dehydrogenation of a saturated aliphatic acid or ester reactant passed with oxygen through a solid catalyst reaction zone, the total oxygen for the catalytic reaction is introduced in fractions at several spaced-apart intervals along the path of the acid or ester reactant through the solid catalyst reaction zone. Such staged addition of oxygen improves the percent conversion and product selectivity for the reaction.

---

This is a continuation-in-part of my copending application Ser. No. 818,818, filed Apr. 23, 1969.

The invention relates to improvements in catalytic oxydehydrogenation of saturated acids and esters to produce corresponding alpha-beta unsaturated acids and esters.

My copending application Ser. No. 818,818 describes a process for oxydehydrogenation of saturated acids and esters, using fixed bed or fluidized bed catalytic reactors. The feed components, comprising oxygen or a gas such as air which contains oxygen, an acid or ester reactant and usually steam, were fed together into the catalyst bed reaction zone and passed all together through the reaction zone from a single feed point. A disadvantage of that process was that increasing the proportion of oxygen in the feed to increase the conversion of the saturated acid or ester would lead to serious loss of product selectivity.

In accordance with the present invention I employ a reactor having means for introducing oxygen into the reaction zone at several points spaced along the path that is followed by the reactants through the catalytic reaction zone, and, instead of feeding all of the oxygen at the initial feed point, I introduce fractions of the oxygen at each of those several points along the path. This enables introduction of larger proportions of total oxygen to the reactant stream resulting in increased conversion without serious loss of product selectivity. In some cases the process will result in improved product selectivity even when using larger total proportions of oxygen.

Other objects and advantages of the invention will be illustrated by reference to the following examples which set forth in more detail certain preferred embodiments of the invention.

EXAMPLE I

The reactor has two packed-bed stages of the catalyst zone separated by a mixing zone in which effluents from the first stage of the catalyst zone can be mixed with air or oxygen introduced from outside the reactor before the mixture proceeds to the second stage of the catalyst zone. Both stages of the catalyst zone are packed with equal amounts of solid catalyst which comprises calcined mixed phosphates of bismuth, iron, and lead in which the metals are combined in the following molar proportions: 2 Bi-1 Fe-0.6 Pb-3.4 P. This catalyst is prepared by the Method B described in my copending application Ser. No. 818,818, filed Apr. 23, 1969.

The reactor is heated to 400° C. and maintained at that temperature throughout each run. A feed mixture containing isobutyric acid in ratio of one mole isobutyric acid vapor to 13.7 moles $H_2O$ is preheated to 400° C., introduced into the first stage of the catalyst zone and fed through the reactor. Air is introduced with the feed stream in the varying proportions shown in Table I for each of a series of runs. The feed rate is adjusted to provide 0.17 to 0.19 seconds total contact time in the reactor. In some of the runs additional air is also introduced at the mixing zone between the first and second stages of the catalyst zones in the amounts shown in Table I. A series of six runs are made at 400° C. and then the reactor temperature is raised to and maintained at 450° C. for the remainder of the 13 runs.

The product stream from the reactor is cooled to condense the methacrylic acid product and other condensates. The non-condensibles are analyzed by gas chromatography and the condensate is analyzed.

From a product stream analysis that is made for each run the percent total conversion of isobutyric acid and percent selectivity of such conversion to methacrylic acid are computed for each run. These percentage values for each run are reported in Table I.

TABLE I

Catalyst: 2 Bi-1 Fe-0.6 Pb-3.4 P
Total feed: 5.5% to 6.0% IBA; $H_2O$/IBA=13.7; balance air
Contact time: 0.17 to 0.19 second

| Run No. | Temp., °C. | Air feed rates, ml./min. at STP | | Total moles $O_2$ fed per mole IBA in feed | Conv., percent | Selectivity, percent |
|---|---|---|---|---|---|---|
| | | Fed initially | Fed to 2d stage | | | |
| 1 | 400 | 65 | 0 | .27 | 32 | 86 |
| 2 | 400 | 33 | 32 | .27 | 32 | 89 |
| 3 | 400 | 33 | 57 | .38 | 39 | 89 |
| 4 | 400 | 123 | 0 | .5 | 57 | 70 |
| 5 | 400 | 61 | 110 | .7 | 64 | 73 |
| 6 | 400 | 61 | 133 | .8 | 70 | 72 |
| 7 | 450 | 65 | 0 | .27 | 37 | 80 |
| 8 | 450 | 33 | 46 | .32 | 40 | 83 |
| 9 | 450 | 33 | 57 | .37 | 46 | 82 |
| 10 | 450 | 123 | 0 | .5 | 63 | 71 |
| 11 | 450 | 61 | 62 | .5 | 64 | 79 |
| 12 | 450 | 61 | 110 | .7 | 70 | 80 |
| 13 | 450 | 61 | 133 | .8 | 78 | 76 |

NOTE.—STP means standard temperature and pressure; IBA means isobutyric acid; Contact time is the ratio of catalyst volume to total gas feed rate.

EXAMPLE II

A five stage reactor is prepared having five separated stages of the catalytic reaction zone, each stage containing ⅕ of the total catalyst, and separated by mixing zones. Into each of these mixing zones a gas such as air or oxygen can be introduced and mixed with the reactant stream as it flows from one stage of the catalyst zone to the next. The same isobutyric acid and steam mixture used in Example I is introduced at the first feed inlet with air in the amounts shown in Table II. The total amount of feed is adjusted to give total contact time of 0.45 second in the five stages. The catalyst is the same as that used in Example I. In the first run all of the air is introduced at the first feed point. In a second run the same total proportion of air is fed but is introduced in several fractions, as shown in Table II, at the first feed inlet and at each of the mixing zones between the five reactor stages. The percent conversion of isobutyric acid and percent selectivity of conversion to methacrylic acid shown in Table II for both runs are computed as in Example I. The reactor is operated at temperature 425° C.

TABLE II

Catalyst: 2 Bi-1 Fe-0.6 Pb-3.4 P.
Total feed: 5 to 6% IBA; H₂O/IBA=13.7; balance air
Contact time: 0.45 seconds
Five stages: temp. 425° C.

| Run No. | Air feed rates, ml./min. at STP to stage | | | | | Total moles O₂ fed per mole IBA in feed | Conv., percent | Selectivity, percent |
|---|---|---|---|---|---|---|---|---|
| | 1 | 2 | 3 | 4 | 5 | | | |
| 14 | 185 | 0 | 0 | 0 | 0 | 0.76 | 76 | 69 |
| 15 | 27 | 41 | 40 | 40 | 37 | 0.76 | 85 | 83 |

Analysis of the data in Tables I and II demonstrates some of the advantages obtained by the use of a multiple stage reactor with oxygen introduced at several intervals along the path of the reactants through the reactor. For example, comparison of Runs 1 and 4 demonstrates that increasing the proportion of oxygen at the feed inlet will increase conversion but will reduce selectivity. Runs 1, 2 and 3 demonstrate that staged oxygen feed permits use of increased total oxygen feed in two stages to increase conversion significantly without loss of selectivity. Runs 4, 5 and 6 demonstrate the same result of increased conversion obtained without loss of selectivity by increasing total oxygen with staged oxygen feed. In Table II Runs 14 and 15 demonstrate the advantages of the staged oxygen feed even more dramatically by the significant increases of both conversion and selectivity obtained with more incremental feed points using the five-stage reactor.

EXAMPLE III

In the foregoing examples the reactant was isobutyric acid. A similar series of runs like Example I but using a reactant feed of about 85% isobutyric acid, 15% methyl isobutyrate will demonstrate comparable improvement in conversion and selectivity of the mixed unsaturated acid and ester products, i.e. mixed methacrylic acid and methyl methacrylate. Accordingly the invention is contemplated for use in the catalytic oxydehydrogenation of mixed acid and ester feeds as well as feeds of only an acid or only an ester.

The invention is illustrated in the foregoing examples by reference to certain preferred embodiments but the invention will be more broadly applicable to oxydehydrogenation of saturated lower fatty acids and esters having the formula

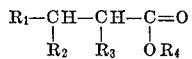

wherein each of R₁ through R₄ is selected from hydrogen and lower alkyl groups having 1-4 carbon atoms. Methyl isobutyrate, for example, is converted to methyl methacrylate by the process of the invention. Generally, the process conditions such as temperature, pressure, contact time, ratios of reactants and the like will be about the same as those described in my copending application Ser. No. 818,818, filed Apr. 23, 1969.

The invention is illustrated in the foregoing examples using an especially preferred catalyst, but is equally applicable to oxydehydrogenation of saturated aliphatic acids and esters to corresponding α,β-unsaturated acids and esters using other suitable solid catalysts such as those described in the aforementioned application Ser. No. 818,818, filed Apr. 23, 1969, and the like. The catalyst in Ser. No. 818,818 comprises calcined mixed phosphates of iron, bismuth and, in some embodiments, lead.

I claim:

1. In a process of making an unsaturated aliphatic acid or ester by catalytic dehydrogenation of a saturated aliphatic or acid or ester reactant defined by the formula:

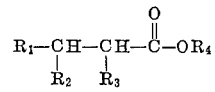

wherein each of R₁ through R₄ is selected from hydrogen and lower alkyl groups having 1–4 carbon atoms passed with oxygen through a solid catalyst reaction zone said catalyst comprising calcined mixed phosphates of bismuth and iron, the improvement wherein the total oxygen for the catalytic reaction is introduced in fractions at several points along the path of flow of the acid or ester reactant through the solid catalyst reaction zone.

2. An improved process defined by claim 1 wherein said reaction zone is divided into multiple stages separated by mixing zones, in each of which mixing zones one of said fractions of oxygen is introduced into the reactant stream passing through said mixing zone from one of said stages to the next.

3. An improved process defined by claim 1 wherein said saturated acid or ester reactant is isobutyric acid and the product is methacrylic acid.

4. A process defined by claim 1 wherein the gas for said oxygen feed is air.

5. A process defined by claim 1 wherein steam is present in the feed stream.

6. A process defined by claim 1 wherein the catalyst comprises calcined mixed phosphates of bismuth, iron and lead.

7. A process defined by claim 1 wherein the saturated aliphatic reactant feed consists of mixed isobutyric acid and methyl isobutyrate and the product is mixed methacrylic acid and methyl methacrylate.

References Cited

UNITED STATES PATENTS

| 2,945,057 | 7/1960 | McDaniel et al. | 260—486 D |
| 3,207,805 | 9/1965 | Gay | 260—486 D |
| 3,370,087 | 2/1968 | Hargis et al. | 260—486 D |

LORRAINE A. WEINBERGER, Primary Examiner

V. GARNER, Assistant Examiner

U.S. Cl. X.R.

252—435; 260—526 N